Nov. 30, 1954  J. W. KARSAI  2,695,520
TIRE TESTING MACHINE
Filed Sept. 19, 1951  2 Sheets-Sheet 1
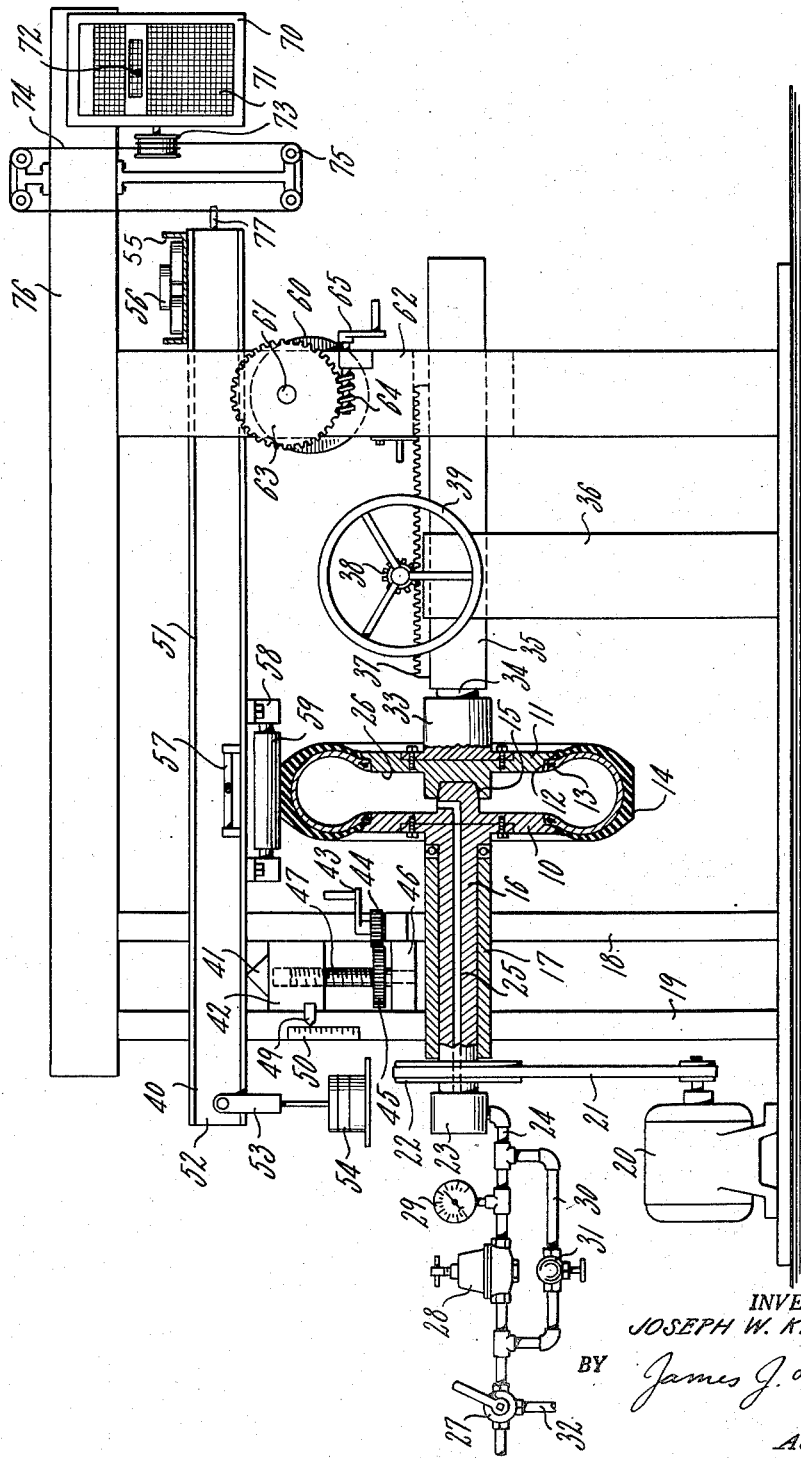
INVENTOR.
JOSEPH W. KARSAI
BY James J. Long
AGENT

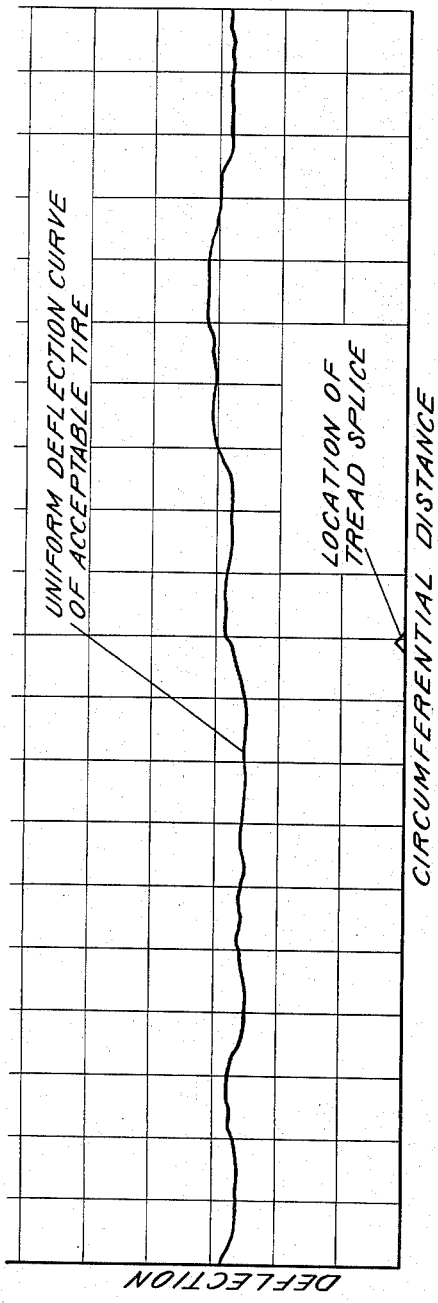
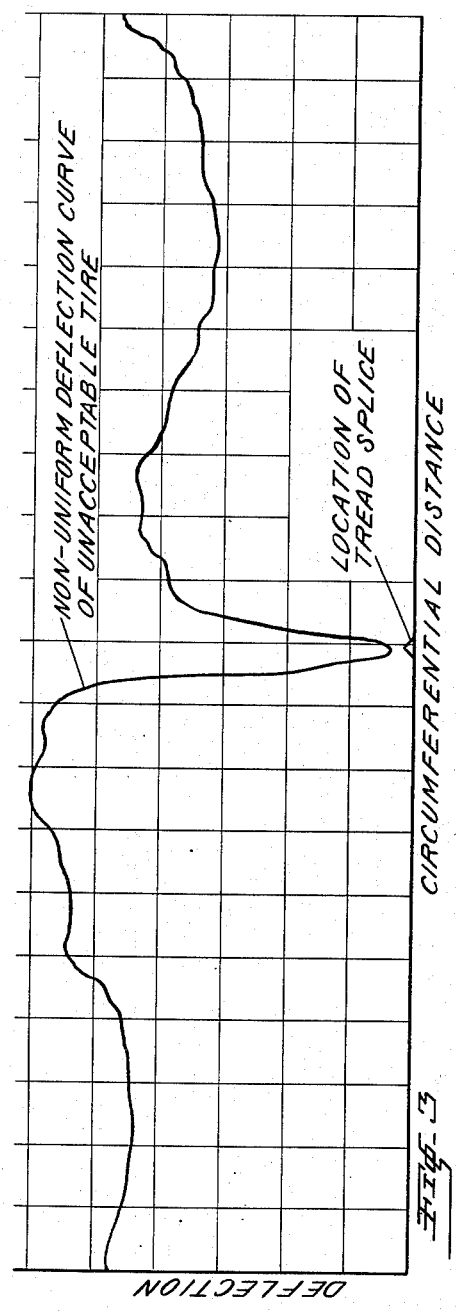

United States Patent Office 2,695,520
Patented Nov. 30, 1954

2,695,520

TIRE TESTING MACHINE

Joseph W. Karsai, Detroit, Mich., assignor to United States Rubber Company, New York, N. Y., a corporation of New Jersey Application September 19, 1951, Serial No. 247,326

5 Claims. (Cl. 73—146)

This invention relates to a machine for testing pneumatic tires, and more particularly it relates to an apparatus for determining the uniformity of the deflection characteristics of a pneumatic tire at various points around the circumference thereof.

A principal object of the invention is to provide a testing apparatus for indicating whether a pneumatic tire casing will have smooth, quiet riding characteristics, or whether it will exhibit in service undesirable vibration or noise. In recent years the increasing demand for smoother and quieter riding in automobiles has given rise to a concomitant demand for more uniform tires. It has been found that tires manufactured by conventional methods occasionally have an inherent non-uniform structure, particularly in the area of the tread splice, which gives rise to undesirable noise or vibration, known as thumping. It has also been found that the ordinary methods and devices for determining the balance of a tire are in many instances incapable of reliably predicting whether or not a given tire will exhibit thumping in service. It has therefore been difficult to determine in advance whether a given pneumatic tire casing will provide the desired riding and vibration characteristics. The invention provides an apparatus in which this information can be obtained rapidly and conveniently.

Additional objects and advantages of the invention will be made manifest in the following detailed description, which is intended to be read with reference to the accompanying drawings, wherein Fig. 1 is an elevational view, partly in section, of a testing apparatus constructed according to the invention, and Figs. 2 and 3 are graphs representing test results obtained with the apparatus.

The apparatus of the invention provides for rotatably mounting a pneumatic tire in the inflated condition, and applying a definite loading force at a given point on the circumference of the tire, while measuring the deflection of the tire produced by such loading force. As the tire is rotated the load is successively applied at various points along the circumference of the tire, and the variation in deflection at such points indicates the relative uniformity or non-uniformity of the tire.

Referring to the drawing, the testing machine shown therein includes two vertical spaced separable flange members 10 and 11, having their outer edges 12 recessed for firmly mounting beads 13 of a pneumatic tire casing 14.

The flanges 10 and 11 are keyed together at 15 at the center of their inner faces for rotation as a unit. To rotate the flanges 10 and 11 a horizontal shaft 16 extends from the center of the outer face of one flange 10 through a supporting bearing sleeve 17 that is in turn securely mounted on supporting standards 18 and 19 of the machine framework. A motor 20 serves to rotate the shaft 16 and the flanges 10, 11 as a unit through a driving belt 21 and pulley 22.

For inflating the mounted tire 14, the outer end of the horizontal shaft 16 carries a rotary seal coupling 23 into which an air supply line 24 passes. The air supply line 24 is in communication with an internal air passageway 25 within the shaft 16, that opens into an air space 26 between the flanges 10 and 11. Entrance of air into the air space 26 and the interior of the tire casing 14 is controlled by a conventional valve 27, and the pressure within the tire may be adjusted to a desired value by means of a regulator 28, as indicated by a pressure gauge 29 in the supply line 24. A by-pass air line 30 containing a control valve 31 is also provided for applying full line pressure to the air chamber 26 without disturbing the setting of the regulator 28. Such full line pressure is utilized as the tire 14 is being mounted on the flanges 10 and 11 to facilitate proper seating of the beads 13 of the tire in the recesses 12 of the flanges. The valve 27 also has an exhaust port 32 for exhausting the air from the chamber 26 and the interior of the tire casing 14.

The remaining wheel flange 11 is provided with a hub 33 that is rotatably mounted on a shaft 34 fixed on the end of a bar 35 that is mounted for sliding movement in a horizontal plane in the upper portion of a supporting standard 36, for the purpose of separating the flanges 10 and 11 when mounting or dismounting a tire 14. The upper surface of the bar 35 is provided with a toothed rack 37 engaged by a pinion gear 38, by means of which the bar 35 and the flange 11 may be moved toward or away from the flange 10, by turning a hand wheel 39 mounted on the pinion gear 38 at the top of the supporting standard 36. When the flanges 10 and 11 are in a separated position the tire casing 14 may be placed therebetween, and then the flanges may be brought together, and the beads 13 of the tire may be firmly seated in the recesses 12 at the edges of the flanges, with the aid of full line air pressure introduced to the air line 24 through the by-pass 30. The by-pass valve 31 is then closed and the pressure within the tire casing is determined by the setting of the regulator 28.

For the purpose of imposing a desired load on the tire casing 14, there is provided a horizontal loading beam 40 that is essentially freely balanced on the apex of a fulcrum 41 supported on a vertically movable block 42 that is slidably mounted between the supporting standards 18 and 19. Vertical adjustment of the fulcrum 41, and hence of the balanced loading beam 40, to a desired level is effected by turning a handle 43 secured to one standard 18 and carrying a gear 44 which meshes with a gear 45 rotatably mounted on top of a supporting bar 46 fixed to the standards 18 and 19. A threaded rod 47 passes upwardly from the gear 45 and is threaded into the lower portion of the block 42. As the fulcrum 41 is raised or lowered by turning the handle 43, its position is indicated by a pointer 49 carried by the block 42, and engaging a fixed scale 51 mounted on the standard 19.

The loading beam 40 is balanced on the fulcrum 41 with its longer end 51 extending over and beyond the tire, and its shorter end 52 extending in an opposite direction. The shorter end 52 of the beam is provided with a pivotally attached downwardly extending bracket 53 on which weights 54 of various sizes may be placed to balance the beam. The longer end 51 of the loading beam carries at its outer end a pan 55 in which further weights 56 may be placed to balance the beam and to provide the desired loading. The loading beam 40 is provided with a spirit level 57 to indicate when the beam is in a horizontal position. On the lower surface of the longer end 51 of the beam 40 a pair of spaced brackets 58 rotatably support a horizontal roller 59 which bears against the tread surface of the tire 14 mounted on the flanges 10, 11 to transmit the load to the tire as the tire rotates.

For raising the longer end 51 of the loading beam 40, to relieve the tire of the load, a cam or eccentric 60 is mounted on a shaft 61 rotatably supported in an upwardly extending frame member 62 of the machine located toward the end of the beam. A gear 63 carried by the shaft 61 engages a worm 64 that may be turned by means of a handle 65, causing the eccentric 60 to bear against the underface of the beam, thereby lifting the load-imposing roller 59 from the tread surface of the mounted tire 14. During the test, the eccentric 60 is positioned in the lowermost position so that it is out of contact with, and does not support the beam.

It will be evident that the height of the loading beam will vary with the deflection of the tire under the imposed load. For the purpose of recording the height of the beam, and hence the deflection of the tire, there is provided a recording device 70 which includes a vertically moving chart 71 and a horizontally movable pen 72. The pen 72 is mechanically coupled to an external rotary drum 73 extending from the side of the recorder, and the horizontal position of the pen with respect to the chart changes with rotation of the drum 73. To transmit motion of the loading beam 40 to the pen 72, a small-diameter flexible cable 74 is wound under tension around the drum 73 and around guide pulleys 75 supported from the upper framework 76 of the machine. The cable 74 is secured at 77 to the outer end of the beam 40 so that upward or downward movement of the beam causes a corresponding movement of the cable and a corresponding rotation of the drum 73. In this way, the pen 72 of the recorder 70 serves to give indication on the chart 71 of the magnitude of the deflection of the tire at any given instant. At the same time, the chart 71 advances vertically, producing a graph showing the variation in the deflection. The arrangement is such that a deflection of the tire is magnified by a factor of about 12 on the chart.

The performance of a typical test with the machine will now be described. The tire casing 14 to be tested is mounted on the flanges 10 and 11 as indicated previously and inflated to the desired controlled pressure through the air passageway 25, by means of the valve 27 and regulator 29, as described above. The handles 43 and 65, which regulate respectively, the height of the supporting fulcrum 41 on which the loading beam 40 is balanced, and the position of the eccentric 60 at the free end of the beam, are turned to bring the beam 40 to a level horizontal position, as indicated by the spirit level 57, with the roller 59 on the under-surface of the beam just contacting the upper surface of the tire tread. Support is then removed from the free end of the beam by revolving the eccentric 60 sufficiently so that the beam will not rest on it when subsequently loaded.

The handle 43 is then turned to lower the pivot end of the beam a definite distance, e. g., 2 inches, as indicated on the scale 50 by the pointer 49. The motor 20 is then started to rotate the tire 14 slowly, suitably at a speed of about ½ R. P. M. While the tire is in motion the counter-motion weights 54 on the short end 52 of the beam 40, or the loading weights 56 at the free end of the beam, are adjusted in such manner as to bring the beam to a horizontal position. When the loading beam 40 is in the horizontal position there is a definite load and deflection imposed on the tire 14 because the fulcrum support 41 has previously been lowered a definite distance as described.

The pen 72 of the recorder may then be adjusted to a suitable position, and the chart 71 may be started in motion to plot the deflection of the tire under the imposed load. A record of the deflection is generally made for 1-¼ revolution of the tire, and the recording operation is preferably started at such a point during the revolution of the tire that the record for the area of the tread splice occurs toward the center portion of the plot.

Thereafter, the rotation of the tire 14 is stopped, the loading beam 40 is raised and the tire is deflated and removed.

Typical records of the deflection of tires under test are indicated in Figs. 2 and 3. These figures indicate the deflection of the tire plotted in a vertical scale, at circumferential points on the tire plotted on a horizontal scale. The deflection characteristic shown in Fig. 2 will be seen to be a comparatively straight line, indicating that the deflection of the tire is essentially the same at all points along the circumference, even at the tread splice and that the tire will be substantially free of thumping in service. The tire represented in Fig. 3, on the other hand, will be seen to have quite a variable deflection characteristic, and displays at the tread splice a deflection widely at variance with the deflection at other points along the circumference. Such a non-uniform deflection curve indicates that the tire will produce thumping in service and is definitely unacceptable.

From the foregoing it is evident that the invention provides a testing apparatus in which the deflection characteristics of a tire may be measured accurately and in a convenient manner, for the purpose of predicting whether or not the tire will have the desired riding and vibration qualities.

Having thus described my invention, what I claim and desire to protect by Letters Patent is:

1. A machine for testing pneumatic tires comprising, in combination, a pair of spaced flanges for supporting a tire, means for separating said flanges to mount the said tire thereon, means for rotating the said flanges as a unit, means for introducing air at a controlled pressure between said flanges to inflate said tire, a loading beam extending axially above said flanges, a pivotal support for said loading beam spaced from said flanges at one side thereof, means for raising and lowering said pivotal support, a roller carried on the under-surface of said loading beam for engaging the tread surface of a tire mounted on said flanges, means for raising and lowering the portion of the loading beam extending across the flanges, means on said loading beam for adjusting weights imposed on either end thereof, and a recorder operably connected to said beam for recording the movement of the beam as the tire revolves.

2. A machine for testing pneumatic tires comprising, in combination, means for rotatably supporting a tire in an inflated condition, means for imposing a definite load on the tread of the tire as the tire revolves, means mounting said load imposing means for free movement towards and away from the tread of the tire and means operatively connected to said load imposing means for recording the amount of movement of said load imposing means as the tire is revolved to thereby indicate the change in deflection of the tire at various points around the circumference of the tire.

3. A machine for testing pneumatic tires comprising, in combination, means for rotatably supporting a tire in an inflated condition, a loading beam extending axially above said supporting means, a pivotal support for said loading beam, means on said beam for engaging said tire to impose a deflection thereon, and recording means operatively connected to said beam for recording the movement of said beam when the tire is revolved to thereby indicate the change in deflection of the tire at various points around the circumference of the tire.

4. A machine for testing pneumatic tires comprising, in combination, a pair of spaced flanges for supporting a tire, means for separating said flanges to mount said tire thereon, means for rotating said flanges as a unit, means for introducing air at a controlled pressure between said flanges to inflate said tire, means for imposing a definite load on the tread of said tire as it is rotated, means mounting said load imposing means for free movement towards and away from the tread of the tire and means operatively connected to said load imposing means for indicating the amount of movement of said load imposing means as the tire is rotated to thereby indicate the change in deflection of the tire at various points around the circumference of the tire.

5. A machine for testing pneumatic tires comprising, in combination, means for rotatably supporting a tire in an inflated condition, means including a rotatably supported roller engageable with the tread of the tire for imposing a definite load on the tread of the tire as the tire is revolved, means mounting said load imposing means for free movement towards and away from the tread of the tire and means operatively connected to said load imposing means for recording the amount of movement of said load imposing means as the tire is revolved to thereby indicate the change in deflection of the tire at various points around the circumference of the tire.

References Cited in the file of this patent

UNITED STATES PATENTS

| Number | Name | Date |
| --- | --- | --- |
| 1,678,363 | Smithers | July 24, 1928 |
| 2,618,971 | Herzegh | Nov. 25, 1952 |

FOREIGN PATENTS

| Number | Country | Date |
| --- | --- | --- |
| 890,906 | France | Nov. 19, 1943 |
| 165,008 | Austria | Jan. 10, 1950 |